United States Patent
Senba et al.

(10) Patent No.: US 10,697,043 B2
(45) Date of Patent: Jun. 30, 2020

(54) SCANDIUM PURIFICATION METHOD

(71) Applicant: SUMITOMO METAL MINING CO., LTD., Tokyo (JP)

(72) Inventors: Yusuke Senba, Niihama (JP); Itsumi Matsuoka, Niihama (JP); Hiroshi Kobayashi, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 16/082,384

(22) PCT Filed: Mar. 1, 2017

(86) PCT No.: PCT/JP2017/008161
§ 371 (c)(1),
(2) Date: Sep. 5, 2018

(87) PCT Pub. No.: WO2017/159372
PCT Pub. Date: Sep. 21, 2017

(65) Prior Publication Data
US 2019/0062869 A1    Feb. 28, 2019

(30) Foreign Application Priority Data
Mar. 14, 2016    (JP) .................... 2016-049394

(51) Int. Cl.
*C22B 59/00*    (2006.01)
*C22B 3/08*    (2006.01)
(Continued)

(52) U.S. Cl.
CPC ............ *C22B 59/00* (2013.01); *C22B 3/0005* (2013.01); *C22B 3/08* (2013.01); *B01D 11/0492* (2013.01); *Y02P 10/234* (2015.11)

(58) Field of Classification Search
CPC .................................................. C22B 59/00
See application file for complete search history.

(56) References Cited

U.S. PATENT DOCUMENTS

2014/0377150 A1    12/2014    Goto et al.
2016/0010177 A1*   1/2016    Goto ................. C22B 59/00
                                              423/21.5
2016/0340757 A1    11/2016    Higaki et al.

FOREIGN PATENT DOCUMENTS

CA    2938134 A1    8/2015
CN    105074022 A   11/2015
(Continued)

OTHER PUBLICATIONS

International Search Report dated Apr. 11, 2017, issued for PCT/JP2017/008161.
(Continued)

*Primary Examiner* — Melissa S Swain
(74) *Attorney, Agent, or Firm* — Locke Lord LLP; James E. Armstrong, IV; Nicholas J. DiCeglie, Jr.

(57) ABSTRACT

In separating scandium and thorium from a leachate obtained by adding sulfuric acid to a nickel oxide ore containing scandium and thorium, scandium is recovered from only one system. The method according to the invention comprises: an extraction step S1 for treating a nickel oxide ore containing scandium and thorium with sulfuric acid to give an acidic solution (a feed solution for extraction), and then solvent-extracting the feed solution with the use of a scandium extractant containing an amide derivative to thereby divide the feed solution into an organic extract (a first organic phase) containing scandium and thorium and a liquid extract (a first aqueous phase) containing impurities; and a washing step S2 for adding sulfuric acid to the organic extract (the first organic phase) and thus dividing the same into washed organic matters (a second organic phase) containing thorium and a washed liquid (a second aqueous phase) containing scandium.

2 Claims, 3 Drawing Sheets

(51) Int. Cl.
*C22B 3/26* (2006.01)
*B01D 11/04* (2006.01)

(56) References Cited

FOREIGN PATENT DOCUMENTS

| | | |
|---|---|---|
| EP | 2712940 A1 | 4/2014 |
| EP | 2907883 A1 | 8/2015 |
| JP | 03-173725 A | 7/1991 |
| JP | 09-194211 A | 7/1997 |
| JP | 09-291320 A | 11/1997 |
| JP | 09-324227 A | 12/1997 |
| JP | 2013-189675 A | 9/2013 |
| JP | 2014-034718 A | 2/2014 |
| JP | 2015-163729 A | 9/2015 |
| WO | 2014/110216 A1 | 7/2014 |

OTHER PUBLICATIONS

Yin et al. "Scandium and Its Alloys," Central South University Press, p. 93., (2007).
Office Action issued in the CN Patent Application No. CN201780014827.X, dated Nov. 1, 2019.
Extended European Search Report dated Aug. 6, 2019, issued in the EP Patent Application No. 17766375.4.

* cited by examiner

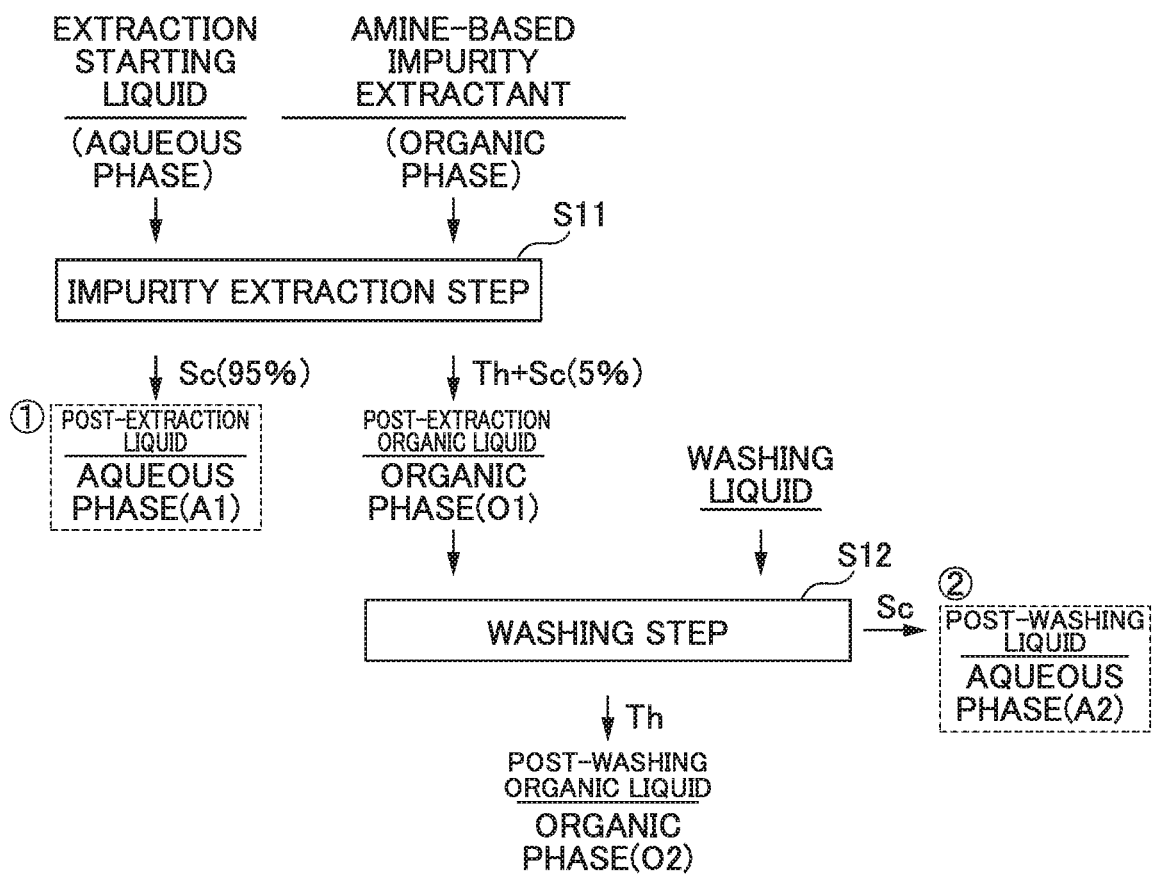

SCANDIUM PURIFICATION METHOD

TECHNICAL FIELD

The present invention relates to a scandium purification method.

BACKGROUND ART

Scandium is extremely valuable as an additive for high-strength alloys and an electrode material for fuel cells. However, scandium has not yet been used widely due to the small production quantity and high cost thereof.

Meanwhile, a trace amount of scandium is contained in nickel oxide ore such as laterite ore and limonite ore. However, nickel oxide ore has not been used industrially as a raw material for nickel for many years because the grade of nickel in nickel oxide ore is low. Consequently, very few studies also have been conducted for a method of industrially recovering scandium from nickel oxide ore.

Nonetheless, in recent years, the high pressure acid leach (HPAL) process has been emerging as a practical method, in which nickel oxide ore is introduced into a pressure vessel along with sulfuric acid, and heated at a high temperature of 240° C. to 260° C. to allow solid-liquid separation into a nickel-containing leachate and a leach residue. In the HPAL process, a neutralizing agent is added to the leachate obtained to separate impurities, and then a sulfurizing agent is added to the resulting leachate from which impurities are separated out, allowing recovery of nickel as nickel sulfide. Subsequently, this nickel sulfide may be subjected to a known nickel refinement process to obtain electrolytic nickel and nickel salt compounds.

In the case of using the HPAL process as described above, scandium which has been contained in nickel oxide ore is contained in the leachate together with nickel (see Patent Document 1). Subsequently, a neutralizing agent is added to the leachate obtained through the HPAL process to separate impurities and then a sulfurizing agent is added to the leachate from which the impurities have been removed to recover nickel as nickel sulfide. Meanwhile, scandium cannot be separated by the above method but remains in the acidic solution after the addition of a sulfurizing agent. In this way, nickel can be effectively separated from scandium by using the HPAL process.

However, the content of scandium contained in nickel oxide ore is generally significantly low, thus the concentration of scandium contained in the acidic solution after the addition of a sulfurizing agent (also referred to as post-sulfuration liquid or barren liquor) in the above method is significantly low to be at mg/l level, and it is difficult to efficiently recover scandium directly from the acidic solution.

For this reason, a treatment for enriching scandium contained in the post-sulfuration liquid and separating the coexisting impurities at the same time is required. As a specific enriching means, for example, there is a method in which enriching is performed using a chelating resin (see Patent Document 2).

In the method disclosed in Patent Document 2, nickel and scandium are first selectively leached from nickel-containing oxide ore into an acidic aqueous solution in an oxidizing atmosphere at high temperature and high pressure to obtain an acidic solution, subsequently the pH of the acidic solution is adjusted to a range of 2 to 4, and then nickel is selectively precipitated and recovered as a sulfide using a sulfurizing agent. Next, the solution obtained after nickel recovery is brought into contact with a chelating resin to adsorb scandium to the chelating resin, the chelating resin is washed with a dilute acid, and then the chelating resin after being washed is brought into contact with a strong acid to elute scandium from the chelating resin.

Further, as a method of recovering scandium from the aforementioned acidic solution, the method of recovering scandium by means of solvent extraction has also been proposed (see Patent Documents 3 and 4).

In the method described in Patent Document 3, an organic solvent prepared by diluting 2-ethylhexylsulfonic acid-mono-2-ethylhexyl with kerosene is first added to a scandium-containing solution of an aqueous phase which contains at least one or more kinds of iron, aluminum, calcium, yttrium, manganese, chromium, or magnesium in addition to scandium, and the scandium component is extracted into the organic solvent. Subsequently, in order to separate yttrium, iron, manganese, chromium, magnesium, aluminum and calcium extracted into the organic solvent together with scandium, these are removed by adding an aqueous solution of hydrochloric acid to the organic solvent and performing scrubbing, and then an aqueous NaOH solution is added to the organic solvent to obtain a slurry containing $Sc(OH)_3$ transformed from scandium remaining in the organic solvent, $Sc(OH)_3$ obtained by filtering this slurry is dissolved with hydrochloric acid to obtain an aqueous solution of scandium chloride. Thereafter, oxalic acid is added to the resulting aqueous solution of scandium chloride to generate a precipitate of scandium oxalate, the precipitate is filtered to separate iron, manganese, chromium, magnesium, aluminum and calcium into the filtrate, and then the precipitate is calcined to obtain high purity scandium oxide.

Moreover, Patent Document 4 describes a method of selectively separating and recovering scandium from a scandium-containing supply liquid, the method including: bringing the scandium-containing supply liquid into contact with an extracting agent at a certain ratio in a batch process.

However, it cannot be said that purification can be easily performed in the case of treating actual nickel oxide ore even though various separation methods as described above are known. The leachate obtained by leaching nickel oxide ore with an acid contains impurities such as iron and aluminum at a much higher concentration than scandium together with scandium, and it is not easy to completely separate the impurities only by a method using a chelating resin and solvent extraction.

Furthermore, nickel oxide ore contains actinoid elements such as thorium in a trace amount in some cases. In this case, according to the method, in which a chelating resin and an organic solvent is used, disclosed in Patent Document 2 and Patent Document 3, it is difficult to efficiently separate scandium from actinoid elements since a number of actinoid elements such as thorium exhibit similar behavior to scandium.

It is required to decrease the concentration of actinoid elements to a concentration of, for example, less than 1 mg/l at the stage of a solution before obtaining a solid containing scandium in order to secure the properties of the product as well as to increase purity of scandium by separating impurities from scandium particularly in order to use recovered scandium in high-performance applications such as electrode materials for a fuel cell.

Patent Document 1: Japanese Unexamined Patent Application, Publication No. H03-173725
Patent Document 2: Japanese Unexamined Patent Application, Publication No. H09-194211

Patent Document 3: Japanese Unexamined Patent Application, Publication No. H09-291320
Patent Document 4: PCT International Publication No. WO2014/110216

DISCLOSURE OF THE INVENTION

Problems to be Solved by the Invention

FIG. 3 is a flow chart showing an example of a method of completely and efficiently separating actinoid elements. As a method of completely and efficiently separating actinoid elements, there is a method of solidifying an aqueous phase containing scandium, which includes an impurity extraction step S11 of subjecting a leachate of nickel oxide ore containing scandium and actinoid elements by sulfuric acid to solvent extraction using an amine-based impurity extractant as an extraction starting liquid and separating the leachate into an aqueous phase (A1) containing scandium and an organic phase (O1) containing an actinoid element.

Amine-based impurity extractants known under specific trade names of Primene JM-T which is a primary amine, LA-1 which is a secondary amine, TNOA (tri-n-octylamine) and TIOA (tri-i-octylamine) which are tertiary amines, and the like can be used as the amine-based impurity extractants.

However, in this method, the content of scandium contained in the aqueous phase (A1) is only about 95% of the treated amount and the remaining scandium to be approximately 5% is extracted into the organic phase (O1) together with thorium and the like. For this reason, there is a problem from the viewpoint of the actual yield.

As an approach for recovering scandium extracted into the organic phase (O1) together with thorium and the like, it is conceivable to further include a washing step S12 of adding an acid to the organic phase (O1) and separating the organic phase (O1) into an aqueous phase (A2) containing scandium and an organic phase (O2) containing thorium.

However, in this method, the target of scandium recovery is divided into two systems of the aqueous phase (A1) and the aqueous phase (A2), thus the process is complicated and there are a number of industrial problems that an extra facility is required upon recovering scandium.

As described above, a method suitable to efficiently separate various kinds and large amounts of impurities from a solution obtained by acid leaching of nickel oxide ore and to industrially recover high purity scandium has not been found out.

The present invention has been proposed in view of the actual circumstances described above, and an object thereof is to provide a scandium purification method which can set the target of scandium recovery to one system when separating scandium and thorium contained in a leachate of nickel oxide ore containing scandium and thorium by sulfuric acid from each other and thus can realize both simplification of the process and a high recovery rate.

Means for Solving the Problems

The present inventors have conducted extensive studies to solve the problems described above. As a result, the present inventors have found out that it is possible to set the target of scandium recovery to one system and thus to realize both simplification of the process and a high recovery rate by first subjecting an extraction starting liquid containing scandium and thorium to solvent extraction using a scandium extractant containing an amide derivative to separate the extraction starting liquid into an organic phase containing scandium and thorium and an aqueous phase containing impurities and then adding sulfuric acid to the organic phase, whereby the present invention has been completed. That is, the present invention provides the followings.

(1) A first embodiment of the present invention provides a scandium purification method including an extraction step of subjecting an acidic solution obtained by treating nickel oxide ore containing scandium and thorium with sulfuric acid to solvent extraction using a scandium extractant containing an amide derivative to separate the acidic solution into a first organic phase containing scandium and thorium and a first aqueous phase containing impurities and a washing step of adding sulfuric acid to the first organic phase to separate the first organic phase into a second organic phase containing thorium and a second aqueous phase containing scandium, in which a pH is adjusted to 1.0 or more and 3.0 or less in the extraction step and a pH is adjusted to 1.0 or more and 2.5 or less in the washing step.

(2) A second embodiment of the present invention provides the scandium purification method according to the first embodiment, in which a volume ratio (O/A ratio) of the first organic phase (O) to the sulfuric acid (A) in the washing step is 0.5 or less.

(3) A third embodiment of the present invention provides the scandium purification method according to the first or second embodiment, in which the amide derivative is represented by the following general formula (I).

[Formula 1]

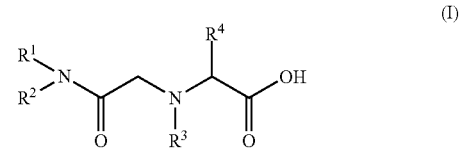

(In the formula (I), $R^1$ and $R^2$ each represent the same alkyl group or different alkyl groups. The alkyl group may be linear or branched. $R^3$ represents a hydrogen atom or an alkyl group. $R^4$ represents a hydrogen atom or any group other than an amino group, which is bonded to an α carbon as an amino acid.)

Effects of the Invention

According to the present invention, it is possible to provide a scandium purification method which can set the target of scandium recovery to one system when separating scandium and thorium from each other and thus can realize both simplification of the process and a high recovery rate.

BRIEF DESCRIPTION OF THE DRAWINGS

FIG. 3 shows a flow diagram for illustrating a scandium purification method when an amine-based impurity extractant is used.

PREFERRED MODE FOR CARRYING OUT THE INVENTION

Hereinafter, specific embodiments of the scandium purification method according to the present invention will be described in more detail with reference to the drawings, but the present invention shall not be limited to the following embodiments at all. The present invention can be implemented with appropriate modifications made without departing from the spirit of the present invention.

<Scandium Purification Method>

Figure 1:
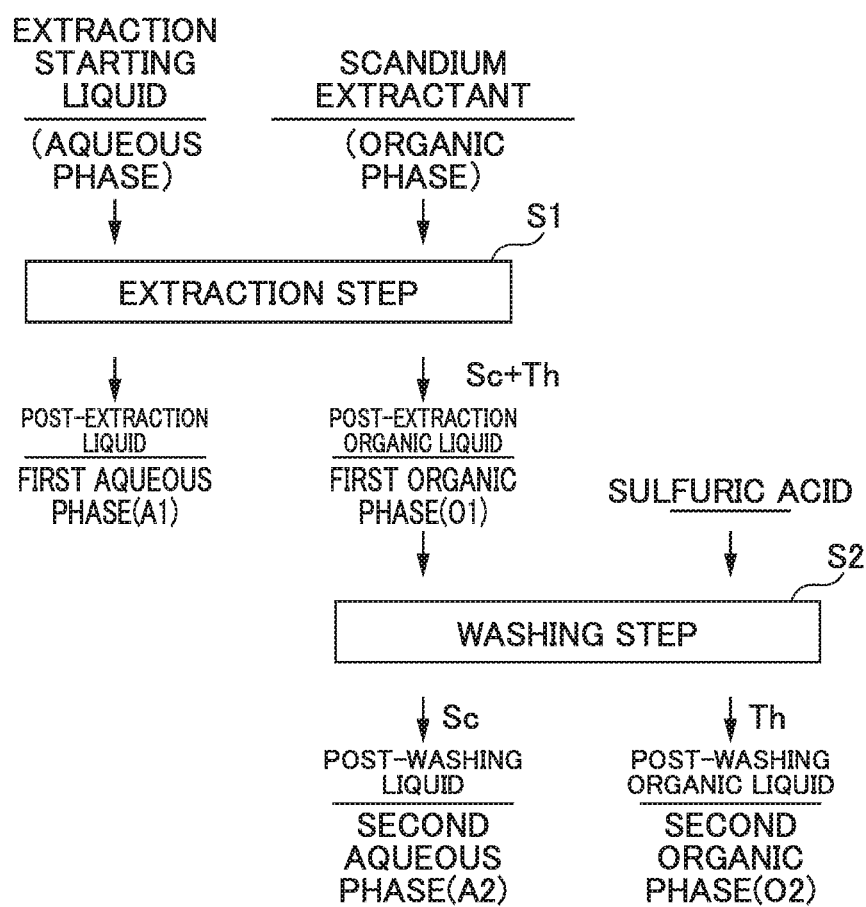
FIG. 1 shows a flow diagram for illustrating a scandium purification method according to an embodiment of the present invention.

FIG. 1 shows a flow diagram for illustrating an example of the scandium purification method according to the present embodiment. This scandium purification method is a method in which scandium and impurities contained in an acidic solution which is obtained by leaching nickel oxide ore with an acid such as sulfuric acid are separated from each other and thus high purity scandium is simply and efficiently recovered.

For example, as shown in the flow diagram of FIG. 1, the scandium purification method according to the present embodiment includes an extraction step S1 of subjecting a leachate (extraction starting liquid) of nickel oxide ore containing scandium and thorium by sulfuric acid to solvent extraction using a scandium extractant containing an amide derivative to extract scandium and thorium into the scandium extractant (post-extraction organic liquid, first organic phase) and separate scandium and thorium from impurities remaining in the acidic solution (post-extraction liquid, first aqueous phase) and a washing step S2 of adding sulfuric acid to the scandium extractant (first organic phase) and separating the scandium extractant into a post-washing liquid (second aqueous phase) containing scandium and a post-washing organic liquid (second organic phase) containing thorium. Moreover, the pH is adjusted to 1.0 or more and 3.0 or less in the extraction step S1 and the pH is adjusted to 1.0 or more and 2.5 or less in the washing step S2.

According to this method, it is possible to more effectively separate impurities, to perform a stable work even when a raw material such as nickel oxide ore which contains a large amount of impurities is used, and to efficiently recover high purity scandium.

In addition, the target of scandium recovery is one system of the second aqueous phase, and thus the process can be simplified as compared with the conventional process.

Note that the scandium extractant after the separation can be reused in the application of scandium extraction since thorium remaining in the post-washing organic liquid (second organic phase) can be separated from the post-washing organic liquid (second organic phase) by bringing the post-washing organic liquid into contact with sulfuric acid at a higher concentration than the sulfuric acid used in the washing step S2.

<Each Step of Scandium Purification Method>

[Extraction Step S1]

The extraction step S1 is a step of subjecting an acidic solution obtained by treating nickel oxide ore containing scandium and thorium with sulfuric acid to solvent extraction using a scandium extractant containing an amide derivative to separate the acidic solution into a first organic phase containing scandium and thorium and a first aqueous phase containing impurities.

[Target for Process for Recovering Scandium]

For the scandium-containing acidic solution from which scandium is to be recovered, an acidic solution obtained by treating nickel oxide ore with sulfuric acid can be used.

As an example of the acidic solution to be subjected to solvent extraction, a post-sulfuration liquid obtained through a hydrometallurgy treatment step of nickel oxide ore which includes a leaching step of leaching nickel oxide ore with an acid such as sulfuric acid at high temperature and high pressure to obtain a leachate, a neutralization step of adding a neutralizing agent to the leachate to obtain a neutralized precipitate containing impurities and a post-neutralization liquid; and a sulfuration step of adding a sulfurizing agent to the post-neutralization liquid to obtain nickel sulfide and a post-sulfuration liquid.

Examples of nickel oxide ore include so-called laterite ore such as limonite ore and saprolite ore. The content of nickel in laterite ore is usually 0.8 to 2.5 wt %, and contained as a hydroxide or a silica magnesia (magnesium silicate) mineral. Further, these types of nickel oxide ore contain scandium.

As the neutralizing agent to be used in the neutralization step, conventionally known neutralizing agents can be used, and examples thereof include calcium carbonate, slaked lime, and sodium hydroxide.

Examples of the sulfurizing agent to be used in the sulfuration step include gaseous hydrogen sulfide, sodium sulfide, and sodium hydride sulfide.

The post-sulfuration liquid which is an acidic solution containing scandium and is obtained by leaching nickel oxide ore with sulfuric acid can be applied as a target solution for the process for recovering scandium. However, the post-sulfuration liquid which is an acidic solution containing scandium may contain, for example, aluminum, chromium and other impurities remaining in the solution without being sulfurized by the sulfuration treatment in the sulfuration step described above in addition to scandium. In view of the above, upon subjecting this acidic solution to solvent extraction, it is preferable to enrich scandium (Sc) by preliminarily removing impurities contained in the acidic solution and to generate a scandium eluate (scandium-containing solution) as the scandium elution step and to use this scandium eluate (scandium-containing solution) as the target for the process for recovering scandium.

In the scandium elution step, impurities such as aluminum contained in the acidic solution may be separated and removed by, for example, a method by the ion exchange treatment so as to obtain a scandium-containing solution in which scandium is enriched.

[Scandium Extractant]

The amide derivative constituting the scandium extractant is characterized by high selectivity for scandium. Examples of such an amide derivative include those represented by the following general formula (I). By introducing an alkyl group into the backbone of an amide, lipophilicity of the amide can be enhanced and the resulting amide derivative can be used as an extractant.

[Formula 2]

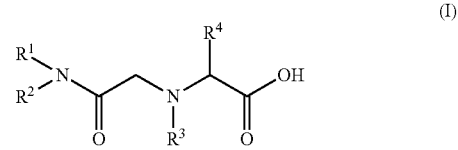

(I)

In the formula, substituents $R^1$ and $R^2$ each represent the same alkyl group or different alkyl groups. The alkyl group may be linear or branched, but the alkyl group is preferably branched since the solubility in an organic solvent can be enhanced. By introducing an alkyl group into the backbone of an amide, lipophilicity of the amide can be enhanced and the resulting amide derivative can be used as an extractant.

In addition, in $R^1$ and $R^2$, the number of carbon atoms of the alkyl group is not particularly limited, but it is preferably 5 or more and 11 or less. The water solubility of the amide derivative is enhanced and the amide derivative may be contained in the aqueous phase when the number of carbon atoms is 4 or less. The surface active performance is enhanced and an emulsion is likely to be formed when the number of carbon atoms is 12 or more. In addition, a third amide derivative layer may be formed separately from an aqueous phase containing an acidic solution and an organic phase containing an organic solvent when the number of carbon atoms is 12 or more.

$R^3$ represents a hydrogen atom or an alkyl group. $R^4$ represents a hydrogen atom or any group other than an amino group, which is bonded to the a carbon as an amino acid.

The amide derivative is not particularly limited as long as it can selectively extract scandium, but it is preferably a glycinamide derivative from the viewpoint of being able to be simply produced. The glycinamide derivative can be synthesized by the following method when the amide derivative is a glycinamide derivative.

First, a 2-halogenated acetyl halide is added to an alkylamine having a structure represented by $NHR^1R^2$ ($R^1$ and $R^2$ are the same as the substituents $R^1$ and $R^2$) and the hydrogen atom in the amine is substituted with 2-halogenated acetyl by a nucleophilic substitution reaction to obtain 2-halogenated (N,N-di)alkylacetamide.

Next, the 2-halogenated (N,N-di)alkylacetamide is added to glycine or a N-alkylglycine derivative and one of the hydrogen atoms in glycine or the N-alkylglycine derivative is substituted with (N,N-di)alkylacetamide group by a nucleophilic substitution reaction. A glycine alkylamide derivative can be synthesized by these two stages of reactions.

In addition, a histidine amide derivative, a lysine amide derivative, and an aspartic acid amide derivative can be synthesized by substituting glycine with histidine, lysine, and aspartic acid. It is considered that the extraction behavior by a glycine alkylamide derivative, a histidine amide derivative, a lysine amide derivative, and an aspartic acid amide derivative falls within the range of the results obtained using the glycine derivative from the complex stability constants of manganese, cobalt and the like to be the target.

The histidine amide derivative is represented by the following general formula (II) when the compound represented by the general formula (I) is a histidine amide derivative.

[Formula 3]

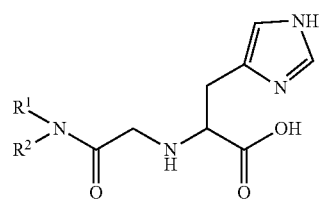

(II)

The lysine amide derivative is represented by the following general formula (III) when the compound represented by the general formula (I) is a lysine amide derivative.

[Formula 4]

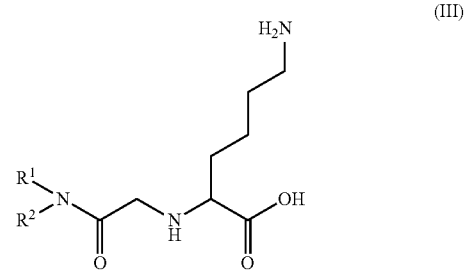

(III)

The aspartic acid amide derivative is represented by the following general formula (IV) when the compound represented by the general formula (I) is an aspartic acid amide derivative.

[Formula 5]

(IV)

In the formulas (II) to (IV), substituents $R^1$ and $R^2$ are the same as those described for the formula (I).

Note that the amide derivative may be a n-methylglycine derivative.

[Extraction of Scandium]

In order to extract scandium ions using the amide derivative, an acidic aqueous solution containing scandium ions of interest is added to and mixed with an organic solution containing the amide derivative while adjusting this acidic aqueous solution. This makes it possible to selectively extract scandium ions of interest into the first organic phase.

However, when scandium ions are extracted using the amide derivative, thorium contained in the extraction starting liquid is not separated but thorium ions are also extracted into the first organic phase in addition to the scandium ions. The subsequent washing step S2 is performed in order to separate the scandium ions and the thorium ions from each other.

At the time of extraction, it is preferable to use a scandium extractant containing an amide derivative after being diluted with, for example, a hydrocarbon-based organic solvent. The organic solvent may be any solvent as long as it dissolves the amide derivative and the metal extraction species, and examples thereof include chlorine-based solvents such as chloroform and dichloromethane, aromatic hydrocarbons such as benzene, toluene and xylene, and aliphatic hydrocarbons such as hexane. These organic solvents may be used singly or in mixture of a plurality thereof, and an alcohol such as 1-octanol may be mixed.

The concentration of the amide derivative can be appropriately set depending on the concentration of scandium, but it is preferably about 10 vol % or more and about 30 vol % or less, in particular more preferably about 20 vol % with respect to 100 vol % of the organic solvent when the phase separability at the time of the extraction and the backward extraction described below and the like are taken into consideration.

In order to efficiently recover scandium from an acidic aqueous solution containing scandium and impurities, it is required to add an organic solution of an extractant while adjusting the pH of the acidic aqueous solution containing scandium to 1.0 or more and 3.0 or less. When the pH is too low, scandium cannot be sufficiently extracted but may remain in the post-extraction liquid (first aqueous phase).

When the pH is too high, not only scandium but also impurities may be extracted into the first organic phase. In addition, when the pH is too high, the separability (phase separation property) is decreased upon separating the solution into the raffinate liquid (first aqueous phase) and the post-extraction organic liquid (first organic phase) by still standing the solution after the extraction operation and it is difficult to perform the work. Specifically, the phase separation is completed within a settling time of from several minutes to maximum 10 minutes when the pH is 3 or less, but a settling time of 1 hour or longer is required in some cases and the efficiency decreases when the pH is more than 3.

It is sufficient that the lower limit of pH is 1.0 or more but the lower limit of pH is more preferably 1.5 or more from the viewpoint of sufficiently extracting scandium.

In addition, in order to prevent impurities from being extracted into the first organic phase together with scandium, it is sufficient that the upper limit of pH is 3.0 or less, but the upper limit of pH is more preferably 2.5 or less and still more preferably 2.0 or less.

For pH adjustment, sodium hydroxide having a concentration of about 4 mol/L is preferably used. This is because it is easy to handle sodium hydroxide, contamination by impurities and generation of precipitates can be prevented, and it is easy to recover sodium hydroxide after separation.

The stirring time and the extraction temperature may be appropriately set depending on the conditions of the acidic aqueous solution containing scandium ions and the organic solution of an extractant.

The volume ratio (O/A ratio) of the organic phase (O) to the extraction starting liquid (A) in the extraction step S1 is not particularly limited and can be appropriately selected.

[Washing Step S2]

The extraction step S2 is a step of adding sulfuric acid to the first organic phase obtained through the extraction step S1 and separating the first organic phase into a second organic phase containing thorium and a second aqueous phase containing scandium.

In this case, it is preferable to adjust the mixing proportion of the sulfuric acid solution to be added to the post-extraction organic liquid (first organic phase) and the pH in the mixed state of the post-extraction organic liquid (first organic phase) with sulfuric acid so that thorium extracted together with scandium is not separated from the post-extraction organic liquid (first organic phase) in the washing step S2.

It is preferable to use a sulfuric acid solution having a concentration range of 0.5 mol/L (1 N) or more and 2.0 mol/L (4 N) or less and it is more preferable to use a sulfuric acid solution having a concentration range of 0.5 mol/L (1 N) or more and 1.0 mol/L (2 N) or less from the viewpoint of handling.

[Mixing Proportion of Post-Extraction Organic Liquid (First Organic Phase) to Sulfuric Acid Solution]

The volume ratio (O/A ratio) of the first organic phase (O) to the sulfuric acid (A) in the washing step S2 is preferably 0.5 or less. When the O/A ratio is too high, not only scandium but also thorium is likely to be extracted into the post-washing liquid (second aqueous phase) after the addition of sulfuric acid to the first organic phase. As a result, the concentration of thorium contained in the post-washing liquid (second aqueous phase) may not be maintained at less than 1 mg/L.

The lower limit of the O/A ratio is not particularly limited. However, when the O/A ratio is set to be extremely small, the amount of the sulfuric acid solution to be used for washing increases to that extent, the concentration of scandium contained in the post-washing liquid (second aqueous phase) relatively decreases, and the recovery efficiency and cost increase. For this reason, the O/A ratio is preferably 0.1 or more and more preferably 0.2 or more.

[pH]

In the washing step S2, the pH is adjusted to 1.0 or more and 2.5 or less. The pH is more preferably 1.5 or more and 2.5 or less and particularly preferably 1.8 or more and 2.3 or less.

For pH adjustment, sodium hydroxide having a concentration of about 4 mol/L is preferably used. This is because it is easy to handle sodium hydroxide, contamination by impurities and generation of precipitates can be prevented, and it is easy to recover sodium hydroxide after separation.

When the pH is too low, not only scandium but also thorium is extracted into the post-washing liquid (second aqueous phase). It is inefficient since it is required to increase the number of washing operations to, for example, 10 times or more even when using a method in which washing is repeated a plurality of times and the difference in separation rate is increased, and the thorium content cannot be substantially decreased to less than 1 mg/L. For this reason, a step of removing thorium by another operation is further required and the process is complicated.

When the pH is too high, scandium cannot be sufficiently extracted into the post-washing liquid (second aqueous phase) and the majority of scandium remains in the post-washing organic liquid (second organic phase). In addition, scandium precipitates as a hydroxide and this leads to loss of scandium.

In order to increase the yield of scandium, it is preferable to repeat the washing step S2 a plurality of times. When the washing step S2 is performed by adjusting the pH in the mixed state of the post-extraction organic liquid (first organic phase) with sulfuric acid to about 2.0, the proportion at which scandium is extracted into the post-washing liquid (second aqueous phase) is about 30% of scandium contained in the post-extraction organic liquid (first organic phase) before washing and the proportion at which thorium is extracted into the post-washing liquid (second aqueous phase) is about 0% of thorium contained in the post-extraction organic liquid (first organic phase) before washing. For this reason, it is preferable to repeatedly perform washing of the post-extraction organic liquid (first organic phase). It is possible to increase the yield of scandium by increasing the number of washing operations of the post-extraction organic liquid (first organic phase).

In addition, when the pH in the mixed state of the post-extraction organic liquid (first organic phase) with sulfuric acid is 2.0 or more, the proportion at which thorium is extracted into the post-washing liquid (second aqueous phase) is about 0% of thorium contained in the post-extraction organic liquid (first organic phase) before washing and thorium is not contained in the post-washing liquid (second aqueous phase) even when the number of washing operations of the post-extraction organic liquid (first organic phase) is increased. Consequently, in the method of the present embodiment, scandium and thorium can be efficiently separated from each other by one time (one stage) of operation and this is efficient from the viewpoint of facility efficiency.

When the washing of the post-extraction organic liquid (first organic phase) is repeated two times, about 50% of scandium contained in the post-extraction organic liquid (first organic phase) before washing can be recovered into the post-washing liquid (second aqueous phase).

When the washing of the post-extraction organic liquid (first organic phase) is repeated three times, about 60% of scandium contained in the post-extraction organic liquid (first organic phase) before washing can be recovered into the post-washing liquid (second aqueous phase).

When the washing of the post-extraction organic liquid (first organic phase) is repeated four times, about 70% of scandium contained in the post-extraction organic liquid (first organic phase) before washing can be recovered into the post-washing liquid (second aqueous phase).

When the washing of the post-extraction organic liquid (first organic phase) is repeated five times, about 80% of scandium contained in the post-extraction organic liquid (first organic phase) before washing can be recovered into the post-washing liquid (second aqueous phase).

When the washing of the post-extraction organic liquid (first organic phase) is repeated seven times, about 90% of scandium contained in the post-extraction organic liquid (first organic phase) before washing can be recovered into the post-washing liquid (second aqueous phase).

When the washing of the post-extraction organic liquid (first organic phase) is repeated nine times, about 95% of scandium contained in the post-extraction organic liquid (first organic phase) before washing can be recovered into the post-washing liquid (second aqueous phase).

The number of washing operations may be appropriately selected by taking the yield of scandium and the washing cost into consideration, but the number of washing operations is preferably 2 times or more and 9 times or less, more preferably 4 times or more and 7 times or less, and particularly preferably 5 times or more and 7 times or less when both the yield of scandium and the washing cost are taken into consideration.

According to the method of the present embodiment, it is possible to more effectively separate impurities, to perform a stable work even when a raw material such as nickel oxide ore which contains a large amount of impurities is used, and to efficiently recover high purity scandium.

In addition, the target of scandium recovery is one system of the post-washing liquid (second aqueous phase), and thus the process can be simplified as compared with the conventional process.

EXAMPLES

Below, the present invention will be described in more detail with reference to Examples. However, the present invention shall not in any sense be limited to these Examples.

Example 1

Preparation of Extraction Starting Liquid (Aqueous Phase)

An extraction starting liquid (aqueous phase) was prepared through the following steps.

First, nickel oxide ore was subjected to pressure acid leaching using sulfuric acid based on a known method such as the method described in Patent Document 1. Subsequently, the pH of the resulting leachate was adjusted and the impurities were removed. Thereafter, a sulfurizing agent was added to the leachate from which the impurities had been removed and nickel sulfide of a solid was removed from the leachate, thereby preparing a post-sulfuration liquid.

Next, the resulting post-sulfuration liquid was brought into contact with a chelating resin to adsorb scandium to the chelating resin. In the present Example, a resin having iminodiacetic acid as a functional group was used as a chelating resin. Next, 0.05 N sulfuric acid was brought into contact with the chelating resin to which scandium had been adsorbed to remove aluminum adsorbed to the chelating resin. Next, 0.5 N sulfuric acid was brought into contact with the chelating resin to which scandium had been adsorbed to obtain a scandium eluate.

Thereafter, a neutralizing agent was added to the scandium eluate to adjust the pH to 4 to 4.5, then the pH was adjusted to 6.0 to obtain a precipitate of scandium hydroxide, subsequently sulfuric acid was added to this precipitate to obtain a solution, and this solution was used as the extraction starting liquid (aqueous phase) in the present Example.

As the composition of the extraction starting liquid (aqueous phase), scandium was 10 g/L and thorium was 0.02 g/L.

Note that the scandium was quantitatively analyzed by a known method using an ICP apparatus (model number: SPS 3000, manufactured by Seiko Instruments Inc.). In addition, the thorium concentration was measured by using an ICP mass spectrometer (ICP-MS) (model number: 7500i, manufactured by Agilent Technologies).

Synthesis of Amide Derivative D2EHAG

As an example of the amide derivative, a glycinamide derivative represented by the general formula (I), namely N—[N,N-bis(2-ethylhexyl)aminocarbonylmethyl]glycine into which two 2-ethylhexyl groups were introduced (also referred to as N,N-di(2-ethylhexyl)acetamide-2-glycine, hereinafter referred to as "D2EHAG") was synthesized.

Synthesis of D2EHAG was performed as follows. First, as shown in the following reaction formula (V), 23.1 g (0.1 mol) of commercially available di(2-ethylhexyl)amine and 10.1 g (0.1 mol) of triethylamine were fractionated, chloroform was added to and dissolved therein, then 13.5 g (0.12 mol) of 2-chloroacetyl chloride was added thereto dropwise, the mixture was washed with 1 mol/l hydrochloric acid one time and then washed with ion exchanged water, and the chloroform phase was fractionated. Next, an appropriate amount (about 10 to 20 g) of anhydrous sodium sulfate was added thereto, followed by dehydration and filtration to obtain 29.1 g of a yellow liquid. The structure of this yellow liquid (reaction product) was identified by using a nuclear magnetic resonance analyzer (NMR), and it was confirmed that the yellow liquid had the structure of 2-chloro-N,N-di (2-ethylhexyl)acetamide (hereinafter referred to as "CDEHAA"). Note that the yield of CDEHAA was 90% with respect to di(2-ethylhexyl)amine of the raw material.

[Formula 6]

(V)

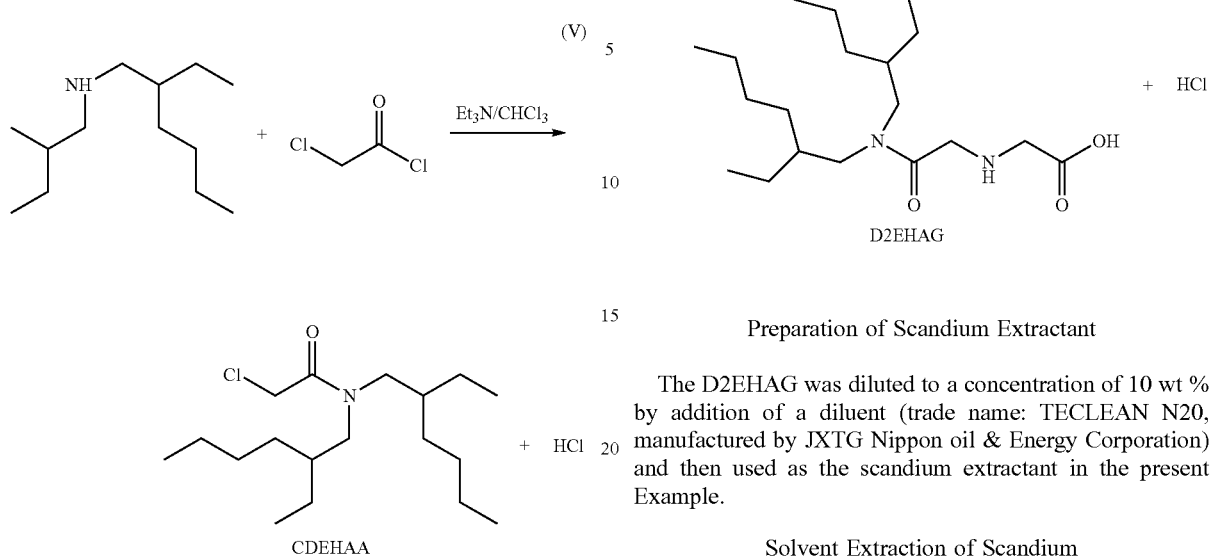

CDEHAA

D2EHAG

Next, as shown in the following reaction formula (VI), 12.72 g (0.04 mol) of CDEHAA was gradually added dropwise to a solution in which 8.0 g (0.2 mol) of sodium hydroxide was added to and dissolved in methanol and 15.01 g (0.2 mol) of glycine was further added thereto while stirring the solution, and the mixture was stirred. After the stirring was terminated, the solvent in the reaction liquid was distilled off, and the residue was added to and dissolved in chloroform. This solution was acidified by addition of 1 mol/l sulfuric acid and then washed with ion exchanged water, and the chloroform phase was fractionated.

Figure 2:
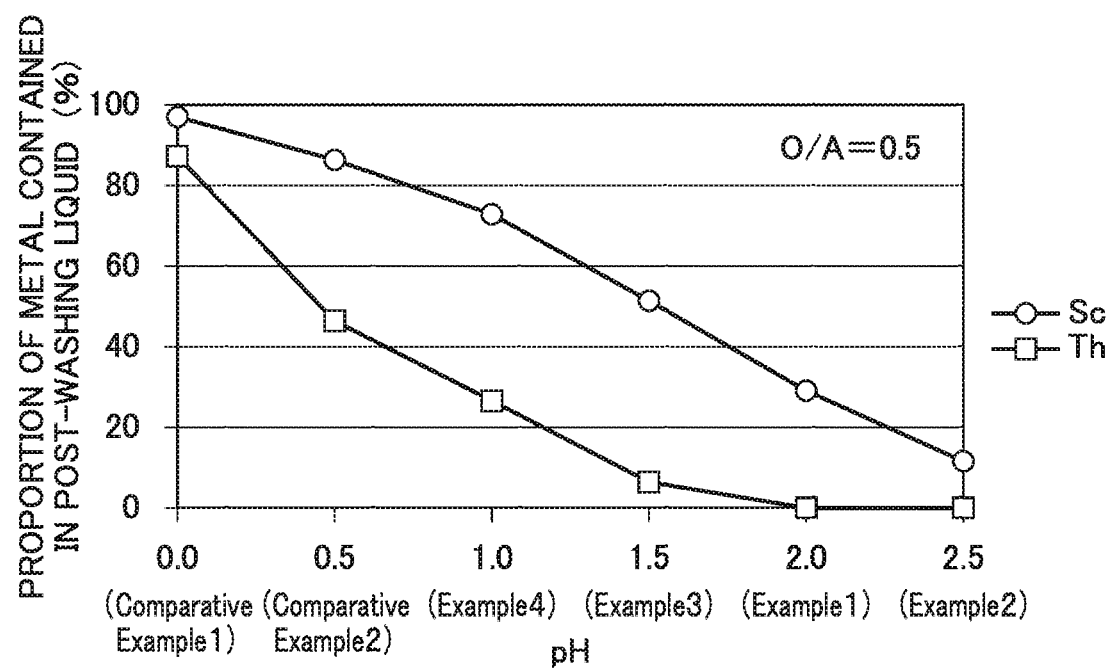
FIG. 2 is a graphic representation showing the relation between the pH when a post-extraction organic liquid (first organic phase) containing scandium and thorium is subjected to a washing treatment using sulfuric acid and the proportions of scandium and thorium contained in a post-washing liquid.

An appropriate amount of anhydrous magnesium sulfate was added to this chloroform phase, followed by dehydration and filtration. The solvent was again removed under reduced pressure to obtain 12.5 g of a yellow paste. The yield based on the CDEHAA amount was 87%. The structure of the yellow paste was identified by NMR and elemental analysis, and it was confirmed to have the structure of D2EHAG as shown in FIGS. 1 and 2. Through the above steps, an amide derivative D2EHAG as a scandium extractant was obtained.

[Formula 7]

(VI)

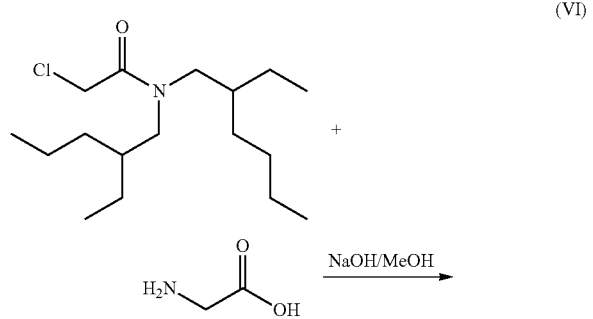

Preparation of Scandium Extractant

The D2EHAG was diluted to a concentration of 10 wt % by addition of a diluent (trade name: TECLEAN N20, manufactured by JXTG Nippon oil & Energy Corporation) and then used as the scandium extractant in the present Example.

Solvent Extraction of Scandium

The extraction starting liquid and the scandium extractant were placed in a beaker having a volume of 100 ml and stirred by using a stirrer, then the mixture was transferred to a shaker and treated for 10 minutes to be mixed and brought into contact with each other, and then the mixture was allowed to still stand and separated into a post-extraction liquid (first aqueous phase) and a post-extraction organic liquid (first organic phase). The volume ratio (O/A ratio) of the scandium extractant to the extraction starting liquid was 5, and the pH in the extraction step S1 was adjusted to 2.0 or more and 2.3 or less.

Upon the solvent extraction, the time for phase separation between the post-extraction liquid (first aqueous phase) and the post-extraction organic liquid (first organic phase) was measured. The results are shown in Table 1.

Washing of Post-Extraction Organic Liquid (First Organic Phase)

Subsequently, the post-extraction organic liquid (first organic phase) was mixed with a sulfuric acid solution having a concentration of 0.5 mol/L (1 N) so that the volume ratio (O/A ratio) of the post-extraction organic liquid (first organic phase) to sulfuric acid was 0.5, and the mixture was stirred for 60 minutes to wash the post-extraction organic liquid (first organic phase), thereby extracting scandium into a post-washing liquid (second aqueous phase). The pH in the washing step S2 was adjusted to 2.0 or more and 2.3 or less. In addition, the washing step S2 was not repeated but the operation was performed one time (one stage).

The proportion at which a metal (scandium, thorium) was extracted into the post-washing liquid (second aqueous phase) was measured by taking the proportion of the metal contained in the post-extraction organic liquid (first organic phase) before washing as 100%. The results are shown in FIG. 2. In addition, the content of thorium contained in the post-washing liquid (aqueous phase) was measured. In addition, whether or not a precipitate of scandium hydroxide was observed when the post-extraction organic liquid (first organic phase) was washed was visually observed. The results are shown in Table 1.

Examples 2 to 4

The extraction step S1 and the washing step S2 were performed according to the same approach as used in Example 1 except that the pH in the washing step S2 was adjusted to the values shown in Table 1. The results are shown in Table 1 and FIG. 2.

Comparative Examples 1 to 3

The extraction step S1 and the washing step S2 were performed according to the same approach as used in Example 1 except that the pH in the washing step S2 was adjusted to the values shown in Table 1. The results are shown in Table 2 and FIG. 2.

Comparative Examples 4, 5

The extraction step S1 was performed according to the same approach as used in Example 1 except that the pH in the extraction step S1 was adjusted to the values shown in Table 1. The results are shown in Table 2.

pH in Washing Step S2

With regard to the washing step S2, it can be seen from FIG. 2 that the mixture can be suitably separated into the post-washing liquid (second aqueous phase) containing scandium and the post-washing organic liquid (second organic phase) containing thorium when the pH is adjusted to 1.0 or more and 2.5 or less (Examples 1 to 4). In any of Examples 1 to 4, the content of thorium contained in the post-washing liquid (second aqueous phase) is 0.4 mg/L or less.

Among these, the content of thorium contained in the post-washing liquid (second aqueous phase) can be kept at 0.2 mg/L or less when the pH is adjusted to 1.5 or more (Examples 1 to 3) and the content of thorium contained in the post-washing liquid (second aqueous phase) can be kept at 0.1 mg/L or less when the pH is adjusted to 2.0 or more (Examples 1 and 2).

It can be seen from FIG. 2 that it is preferable as the pH is lower from the viewpoint of the yield of scandium. By

TABLE 1

|  |  | Example | | | | Comparative Example | | | | |
| --- | --- | --- | --- | --- | --- | --- | --- | --- | --- | --- |
|  |  | 1 | 2 | 3 | 4 | 1 | 2 | 3 | 4 | 5 |
| Extraction step S1 | O/A ratio | 5 | 5 | 5 | 5 | 5 | 5 | 5 | 5 | 5 |
|  | pH | 2 | 2 | 2 | 2 | 2 | 2 | 2 | 0.5 | 3.5 |
|  | Phase separation time (Minutes) | 10 | 10 | 10 | 10 | 10 | 10 | 10 | 10 | 45< |
| Washing step S2 | O/A ratio | 0.5 | 0.5 | 0.5 | 0.5 | 0.5 | 0.5 | 0.5 | 0.5 | — |
|  | pH | 2.0 | 2.5 | 1.5 | 1.0 | 0.0 | 0.5 | 3.0 | 2.0 | — |
|  | Th in post-washing liquid (mg/L) | <0.1 | <0.1 | 0.1 | 0.4 | 1.0 | 0.9 | — | — | — |
|  | Precipitate of Sc hydroxide | Absence | Absence | Absence | Absence | Absence | Absence | Presence | Absence | — |

("—" indicates that it is unmeasured.)

Discussion pH in Extraction Step S1

With regard to the extraction step S1, it has been confirmed that the phase separation time after the extraction step S1 is about 10 minutes when the pH of the acidic aqueous solution containing scandium is 3 or less (Examples 1 to 4 and the like). On the other hand, when the pH is more than 3, the phase separation between the post-extraction liquid (first aqueous phase) and the post-extraction organic liquid (first organic phase) does not occur but the post-extraction liquid (first aqueous phase) and the post-extraction organic liquid (first organic phase) remain mixed even after still standing for 45 minutes and it is thus impossible to separate the mixture into two phases (Comparative Example 5).

In addition, when the pH in the extraction step S1 is too low, it cannot be said that the content of scandium contained in the post-washing liquid (aqueous phase) is sufficient (Comparative Example 4). This is presumably because scandium cannot be sufficiently extracted into the post-extraction organic liquid (first organic phase) in the extraction step S1 but remains in the post-extraction liquid (first aqueous phase).

decreasing the pH, the number of washing operations of the post-extraction organic liquid (first organic phase) can be kept small.

It is most preferable that the pH is adjusted to 1.8 or more and about 2.3 when both the efficiency of separating scandium from thorium and the improvement in the yield are taken into consideration (Example 1).

On the other hand, it is not preferable that the pH in the washing step S2 is too low since the content of thorium contained in the post-washing liquid (aqueous phase) may be 1.1 mg/L or more (Comparative Examples 1 and 2).

In addition, a hydroxide precipitate of scandium is generated in the washing step S2 and scandium cannot be efficiently recovered when the pH in the washing step S2 is too high (Comparative Example 3).

EXPLANATION OF REFERENCE NUMERALS

S1 extraction step
S2 washing step

The invention claimed is:
1. A scandium purification method comprising:
an extraction step of subjecting an acidic solution obtained by treating nickel oxide ore containing scan- dium and thorium with sulfuric acid to solvent extraction using a scandium extractant containing an amide derivative to separate the acidic solution into a first organic phase containing scandium and thorium and a first aqueous phase containing impurities; and a washing step of adding sulfuric acid to the first organic phase to separate the first organic phase into a second organic phase containing thorium and a second aqueous phase containing scandium, wherein a pH is adjusted to 1.0 or more and 3.0 or less in the extraction step, and a pH is adjusted to 1.0 or more and 2.5 or less in the washing step, and a volume ratio (O/A ratio) of the first organic phase (O) to the sulfuric acid (A) in the washing step is 0.1 or more and 0.5 or less.

2. The scandium purification method according to claim 1, wherein the amide derivative is represented by the following general formula (I):

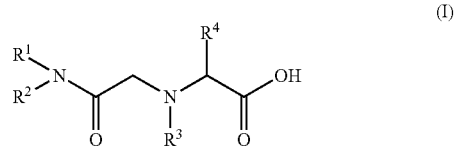

In the formula (I), $R^1$ and $R^2$ each represent the same alkyl group or different alkyl groups wherein the alkyl group may be linear or branched; $R^3$ represents a hydrogen atom or an alkyl group; $R^4$ represents a hydrogen atom or any group other than an amino group, which is bonded to an a carbon as an amino acid.

* * * * *